US011295522B2

(12) United States Patent
Akman et al.

(10) Patent No.: US 11,295,522 B2
(45) Date of Patent: *Apr. 5, 2022

(54) THREE-DIMENSIONAL (3D) MODEL CREATION AND INCREMENTAL MODEL REFINEMENT FROM LASER SCANS

(71) Applicant: Autodesk, Inc., San Rafael, CA (US)

(72) Inventors: Oytun Akman, Kensington, CA (US); Ronald Poelman, San Rafael, CA (US); Yan Fu, San Carlos, CA (US)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,871

(22) Filed: Nov. 3, 2020

(65) Prior Publication Data

US 2021/0134057 A1 May 6, 2021

Related U.S. Application Data

(63) Continuation of application No. 16/541,447, filed on Aug. 15, 2019, now Pat. No. 10,825,243.

(51) Int. Cl.
*G06T 17/10* (2006.01)
*G06T 7/11* (2017.01)
(Continued)

(52) U.S. Cl.
CPC .............. *G06T 17/10* (2013.01); *G01S 17/42* (2013.01); *G01S 17/89* (2013.01); *G06T 5/00* (2013.01);
(Continued)

(58) Field of Classification Search
CPC ... G06T 17/10; G06T 7/11; G06T 7/13; G06T 5/00; G06T 15/06; G06T 15/10;
(Continued)

(56) References Cited

U.S. PATENT DOCUMENTS 6,172,679 B1 * 1/2001 Lim ...................... G06T 15/40
345/421
8,605,093 B2 12/2013 Fu et al.
(Continued)

FOREIGN PATENT DOCUMENTS

WO 2017100658 6/2017

OTHER PUBLICATIONS

Bernardini, F., et al., "The ball pivoting algorithm for surface reconstruction", IEEE Transactions on Visualization and Computer Graphics, Oct.-Dec. 1999, pp. 349-359, vol. 5, No. 4.
(Continued)

*Primary Examiner* — Jitesh Patel
(74) *Attorney, Agent, or Firm* — Gates & Cooper LLP

(57) ABSTRACT

A method, system, and apparatus create a 3D CAD model. Scan data from two or more structured scans of a real-world scene are acquired and each scan processed independently by segmenting the scan data into multiple segments, filtering the scan data, and fitting an initial model that is used as a model candidate. Model candidates are clustered into groups and a refined model is fit onto the model candidates in the same group. A grid of cells representing points is mapped over the refined model. Each of the grid cells is labeled by processing each scan independently, labeling each cell located within the refined model as occupied, utilizing back projection to label remaining cells as occluded or empty. The labels from multiple scans are then combined. Based on the labeling, model details are extracted to further define and complete the refined model.

20 Claims, 14 Drawing Sheets

(51) Int. Cl.
*G06T 5/00* (2006.01)
*G06T 7/13* (2017.01)
*G06T 15/06* (2011.01)
*G01S 17/42* (2006.01)
*G01S 17/89* (2020.01)
*G06T 15/10* (2011.01)

(52) U.S. Cl.
CPC .................. *G06T 7/11* (2017.01); *G06T 7/13* (2017.01); *G06T 15/06* (2013.01); *G06T 15/10* (2013.01); *G06T 2200/04* (2013.01); *G06T 2207/10028* (2013.01); *G06T 2207/20072* (2013.01); *G06T 2210/04* (2013.01)

(58) Field of Classification Search
CPC ....... G06T 2200/04; G06T 2207/10028; G06T 2207/20072; G06T 2210/04; G01S 17/42; G01S 17/89
See application file for complete search history.

(56) References Cited

U.S. PATENT DOCUMENTS

| | | |
|---|---|---|
| 9,508,186 B2 | 11/2016 | Poelman et al. |
| 2009/0043439 A1* | 2/2009 | Barfoot ................ G05D 1/0297 701/25 |
| 2011/0304619 A1 | 12/2011 | Fu et al. |
| 2013/0218472 A1* | 8/2013 | Fu ............................ G06T 7/11 702/5 |
| 2014/0191894 A1* | 7/2014 | Chen .................... G01S 13/867 342/52 |
| 2015/0006126 A1 | 1/2015 | Taguchi et al. |
| 2015/0063683 A1 | 3/2015 | Fu |
| 2015/0125071 A1* | 5/2015 | Poelman ................ G06T 15/04 382/154 |
| 2015/0154199 A1* | 6/2015 | Akman .................... G06K 9/32 707/737 |
| 2017/0193692 A1 | 7/2017 | Huang et al. |
| 2019/0138823 A1* | 5/2019 | Doria ..................... G06T 7/521 |

OTHER PUBLICATIONS

Qiu, R., et al., "Pipe-Run Extraction and Reconstruction from Point Clouds", Computer Vision-ECCV, 2014, pp. 17-30.
Ochmann, S., et al., "Automatic reconstruction of parametric building models from indoor point clouds", Computers & Graphics, 2016, pp. 94-103, vol. 54.
Murali, S., et al., "Indoor Scan2BIM: Building Information Models of House Interiors", IEEE/RSJ International Conference on Intelligent Robots and Systems (IROS), Sep. 24-28, 2017, pp. 1-8.
Okorn, B., et al., "Toward Automated Modeling of Floor Plans", Proceedings of the Symposium on 3D Data Processing, Visualization and Transmission, 2010, pp. 1-8, vol. 2.
Adan, A., et al., "3D Reconstruction of Interior Wall Surfaces Under Occlusion and Clutter", 3D imaging, modeling, processing, Visualization and Transmission (3DIMPVT), 2011 International Conference on IEEE 2011, pp. 275-281.
Bassier, M., et al., "Automated Semantic Labelling of 3D Vector Models for Scan-to-BIM", 4th Annual International Conference on Architecture and Civil Engineering (ACE 2016), pp. 93-100.
Schnable, R. et al., "Completion and reconstruction with primitive shapes", Computer Graphics Forum, EUROGRAPHICS, 2009, pp. 1-10, vol. 28, No. 2.
Jung, J., et al., "Productive modeling for development of as-built BIM of existing indoor structures", Automation in Construction, 2014, pp. 68-77, vol. 42.

* cited by examiner

THREE-DIMENSIONAL (3D) MODEL CREATION AND INCREMENTAL MODEL REFINEMENT FROM LASER SCANS

CROSS-REFERENCE TO RELATED APPLICATIONS

This application is a continuation under 35 U.S.C. § 120 of application Ser. No. 16/541,447 (now U.S. Pat. No. 10,825,243, filed on Aug. 15, 2019 (issued on Nov. 3, 2020), with inventor(s) Oytun Akman, Ronald Poelman, and Yan Fu, entitled "Three-Dimensional (3D) Model Creation and Incremental Model Refinement From Laser Scans," which application is incorporated by reference herein.

This application is related to the following co-pending and commonly-assigned patent application, which application is incorporated by reference herein:

U.S. patent application Ser. No. 15/788,630, filed on Oct. 19, 2017, with inventor(s) Yan Fu, entitled "Building Datum Extraction from Laser Scanning Data", which application is a continuation under 35 U.S.C. § 120 of application Ser. No. 14/465,569, filed on Aug. 21, 2014, with inventor(s) Yan Fu, entitled "BUILDING DATUM EXTRACTION FROM LASER SCANNING DATA," which application is incorporated by reference herein, and which application claims the benefit under 35 U.S.C. Section 119(e) of the following co-pending and commonly-assigned U.S. provisional patent application, which is incorporated by reference herein: Provisional Application Ser. No. 61/871,042, filed on Aug. 28, 2013, by Yan Fu, entitled "BUILDING DATUM EXTRACTION FROM LASER SCANNING DATA,";

U.S. Pat. No. 8,605,093, filed on Aug. 3, 2010 and issued on Dec. 10, 2013, with inventor(s) Yan Fu, Xiaofeng Zhu, Jin Yang, and Zhenggang Yuan, entitled "Pipe Reconstruction from Unorganized Point Cloud Data", which application claims the benefit under 35 U.S.C. Section 119(e) of U.S. provisional patent application, which is incorporated by reference herein: Provisional Application Ser. No. 61/353,486, filed on Jun. 10, 2019, by Yan Fu Xiaofeng Zhu, Jin Yang, and Zhenggang Yuan, entitled "Pipe Reconstruction From Unorganized Point Cloud Data,";

U.S. patent application Ser. No. 16/022,203, filed on Jun. 28, 2018, with inventor(s) Oytun Akman, Ronald Poelman, and Seth Koterba entitled "Automatic Registration", which application is a continuation under 35 U.S.C. § 120 of U.S. patent application Ser. No. 15/625,499, filed on Jun. 16, 2017, with inventor(s) Oytun Akman, Ronald Poelman, and Seth Koterba, entitled "AUTOMATIC REGISTRATION," which application is incorporated by reference herein, and which application is a continuation of U.S. patent application Ser. No. 14/558,243, filed on Dec. 2, 2014, with inventor(s) Oytun Akman, Ronald Poelman, and Seth Koterba, entitled "AUTOMATIC REGISTRATION," which application is incorporated by reference herein, and which application claims the benefit under 35 U.S.C. Section 119(e) of the following co-pending and commonly-assigned U.S. provisional patent application(s), which is/are incorporated by reference herein: Provisional Application Ser. No. 61/910,698, filed on Dec. 2, 2013, by Oytun Akman, Ronald Poelman, and Seth Koterba, entitled "Automatic Registration,";

U.S. patent application Ser. No. 12/849,670, entitled "PRIMITIVE QUADRIC SURFACE EXTRACTION FROM UNORGANIZED POINT CLOUD DATA", by Yan Fu, Xiaofeng Zhu, Jin Yang, and Zhenggang Yuan, filed on Aug. 3, 2010, which application claims priority to Provisional Application Ser. No. 61/353,492, filed Jun. 10, 2010, by Yan Fu, Jin Yang, Xiaofeng Zhu, and Zhenggang Yuan, entitled "PRIMITIVE QUADRIC SURFACE EXTRACTION FROM UNORGANIZED POINT CLOUD DATA,";

U.S. Pat. No. 9,508,186/patent application Ser. No. 14/536,266, entitled "PRE-SEGMENT POINT CLOUD DATA TO RUN REAL-TIME SHAPE EXTRACTION FASTER", by Ronald Poelman and Oytun Akman, filed on Nov. 7, 2014, and issued on Nov. 29, 2016, which application claims the benefit under 35 U.S.C. Section 119(e) of Provisional Application Ser. No. 61/901,069, filed on Nov. 7, 2013, by Ronald Poelman and Oytun Akman, entitled "Pre-Segment Point Cloud Data to Run Real-Time Shape Extraction Faster,"; and U.S. patent application Ser. No. 14/536,232, entitled "OCCLUSION RENDER MECHANISM FOR POINT CLOUDS", by Paulus Jacobus Holverda and Ronald Poelman, filed on Nov. 7, 2014, which application claims the benefit under 35 U.S.C. Section 119(e) of Provisional Application Ser. No. 61/901,067, filed on Nov. 7, 2013, by Paul Holverda and Ronald Poelman, entitled "Occlusion Render Mechanism for Point Clouds,".

BACKGROUND OF THE INVENTION

1. Field of the Invention

The present invention relates generally to model generation from point clouds, and in particular, to a method, system, apparatus, and article of manufacture/computer program product for creating a three-dimensional (3D) building information model based on multiple laser scans.

2. Description of the Related Art (Note: This application references a number of different publications as indicated throughout the specification by reference numbers enclosed in brackets, e.g., [1]. A list of these different publications ordered according to these reference numbers can be found below in the section entitled "References." Each of these publications is incorporated by reference herein.)

3D BIM models are becoming more and more popular in applications such as building and plant retrofitting, facility management and emergency planning. In reality, many old building or facilities lack accurate BIM models. Even for modern buildings, the BIM model created during the design phase might be different from the actual resulting as-built proj ect/conditions. Therefore, it is necessary to create as-built BIM models. Terrestrial laser scanners are employed to capture a set of accurate points for the as-built conditions. Afterwards, 3D model extraction from point clouds becomes an important part to convert the captured point cloud to 3D as-built models.

Created 3D models approximate the points contributing to the model. Accordingly, the best 3D model is one that minimizes a predefined cost function for approximating the points. However, how to automatically convert the high precision laser scanning data into 3D models remains an open problem.

There are some applications available to create a mesh model from a point cloud. However, mesh models are still cumbersome for BIM applications. Another way of creating 3D models is to first unify all of the point cloud data coming from different positions and/or sensors (thereby creating) a unified point cloud, and then performing model fitting and extraction on the unified data set. This approach requires a unification process to run before extraction and therefore needs additional time for unification. Structural information from tripod based laser scans is lost after unification. Moreover, the amount of required data to perform the unification and extraction process results in an increase in both memory and time complexity due to the unification with the search space becoming larger for extraction.

To better understand the above summarized problems, a description of the prior art and related work may be useful.

A straightforward strategy of 3D model reconstruction is to create a mesh representation of the unified point cloud data by minimizing the error between the mesh and the input point clouds [1]. However, it is difficult to generate a smooth surface representation with the presence of noisy points and there is no semantic information associated with the mesh model.

There are some algorithms that reconstruct 3D models by detecting primitives to the points using RANSAC (Random Sample Consensus) or a histogram based method, but these kinds of methods are usually applied directly to the whole unified unorganized point cloud data set, and raise a high requirement on memory space and time complexity (e.g., if a dense point cloud is used). Accordingly, such a RANSAC or histogram based method is unsuitable for large-scale scanning projects [2-4, 10, 15]. Qiu et al [4] uses a divide and conquer strategy to solve large scale projects by dividing the whole scene into uniform cubic sub-volumes to process separately, and then a merge process is required to merge the results together in a later stage.

Some other works [12, 13] project all of the point clouds into a plane or create a slice at a specified height, and then extract wall structures using histogram based methods. However, a single slice cannot capture the complete 3D information of the scanned environment and it won't capture the other detailed information such as windows/doors on the wall structure.

Some other approaches solve the modeling problem from a high-level structure. Ochmann et al [9] utilizes coarse room segmentation by assuming there is only one scan in each room, and then labels the points with a room ID by ray casting from the point to a semi-sphere to determine the major room label the point can see, which is very time-consuming for high density laser scans. The wall structure is also extracted using a RANSAC algorithm, and then room information is extracted based on the candidate walls. Windows and doors are classified using SVM (Support Vector Machines). The method proposed in [11] primarily handles indoor building data from an image based matching algorithm or a mobile 3D depth sensor, both of which produce relatively sparse point cloud data compared with laser scanners. Moreover, a 3D grid is built for the point cloud to reduce the amount of input data. Such a 3D grid is very memory intensive, which makes it impractical to handle the large scale of laser scans. The hypothetical plane structures are detected using One-Point RANSAC Model fitting and then the planes are labeled in a heuristic way (which requirements the establishment of a set of rules). The method proposed in [14] accepts flattened meshes as input instead of point cloud data set, and planes are extracted from the flatten meshes. The planes are also labeled by heuristic rules.

Huang et al. [7] generates a set of skeleton points and then reconstructs a three-dimensional point cloud model according to the skeleton points, which is not suitable for large BIM scanning project. [8] fuses the raw point cloud data first, and then extracts features such as walls and floors from the fused data. [8] also requires users to identify one floor plane and one wall plane through user interaction.

In view of the above, what is needed is the capability to efficiently convert multiple laser scanned point clouds to a BIM model (as well as 2D floor plans) with a minimum amount of user interaction in an efficient manner.

SUMMARY OF THE INVENTION

Embodiments of the invention provide an approach in which the initial models are extracted from individual scans and then merged with other scan models to create a refined and more complete model. This approach simplifies the overall extraction process by splitting the process into extraction from individual scans and then unification of individual models. This approach can also be used in incremental steps, in which incoming models are used to refine and improve already existing models. Accordingly, such an approach is more useful at handling large-scale scanning projects.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Logical Overview

Figure 1:
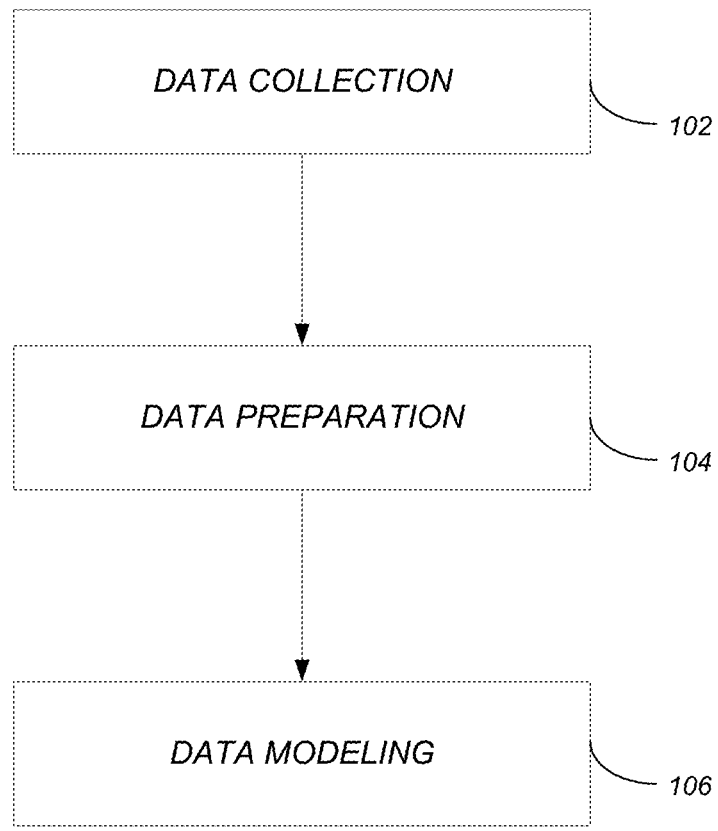
FIG. 1 illustrates the logical flow for creating a 3D model that is incrementally refined from laser scans in accordance with one or more embodiments of the invention.

FIG. 1 illustrates the logical flow for creating a 3D model that is incrementally refined from laser scans in accordance with one or more embodiments of the invention. There are essentially three primary steps—data collection 102, data preparation 104, and data modeling 106.

Data Collection

Data collection 102 consists of acquiring multiple scans of a real-world scene from a laser scanner (i.e., laser scanned data/point clouds). In one or more embodiments, the collected data consists of structured/organized scans (e.g., spherical laser scans) where the scan position is known.

Data Preparation

Figure 2:
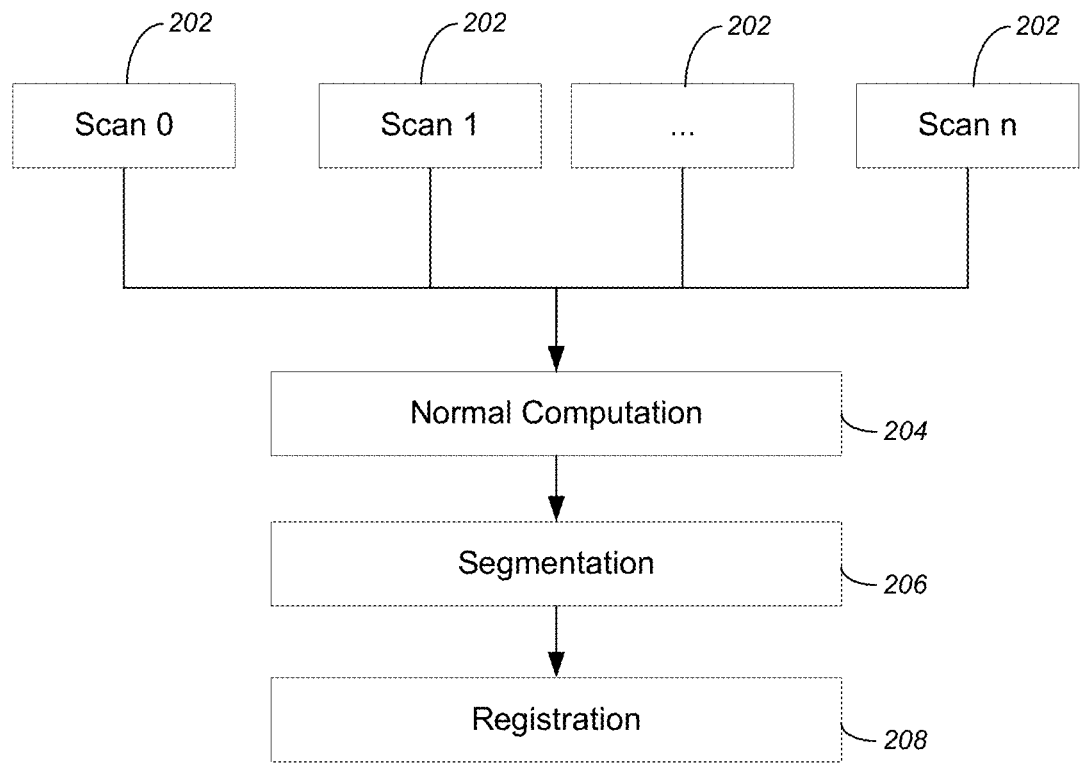
FIG. 2 illustrates the data preparation process in accordance with one or more embodiments of the invention.
Figure 3:
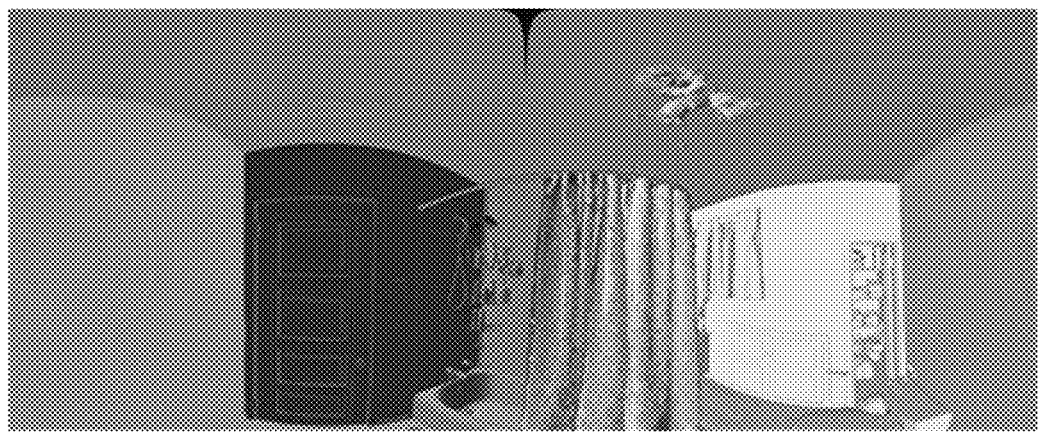
FIG. 3 illustrate an image of a normal map for a spherical scan in accordance with one or more embodiments of the invention.

FIG. 2 illustrates the data preparation process in accordance with one or more embodiments of the invention. The model extraction process may utilize registered spherical laser scans 202 as input [6] (i.e., from data collection 102) so that all the scan points are in the same coordinate system (i.e., a structured scan with a known scan location/origin is utilized). To extract segments from the scans, the normal of the input point cloud may also be estimated/computed at 204. The surface normal may be calculated for each point in the imported scan file. A combination of box-filtering and unconstrained least-squares estimation may be used for fast operation. FIG. 3 illustrates an image of a normal map for a spherical scan in accordance with one or more embodiments of the invention.

Then, the extracted normal and spatial distance between points are utilized to group points into similar regions using an adaptive graph-based segmentation method. The basic idea is to define a difference measurement based on normal, distance and intensity of the points and then make sure the difference between two points inside a group must be smaller than the difference between two points that belong to different groups. At step 206, in the segmentation process, the input laser scans 202 are converted into a hierarchical data structure where the laser scans are organized into a set of segments with similar surface properties [16].

Figure 4:
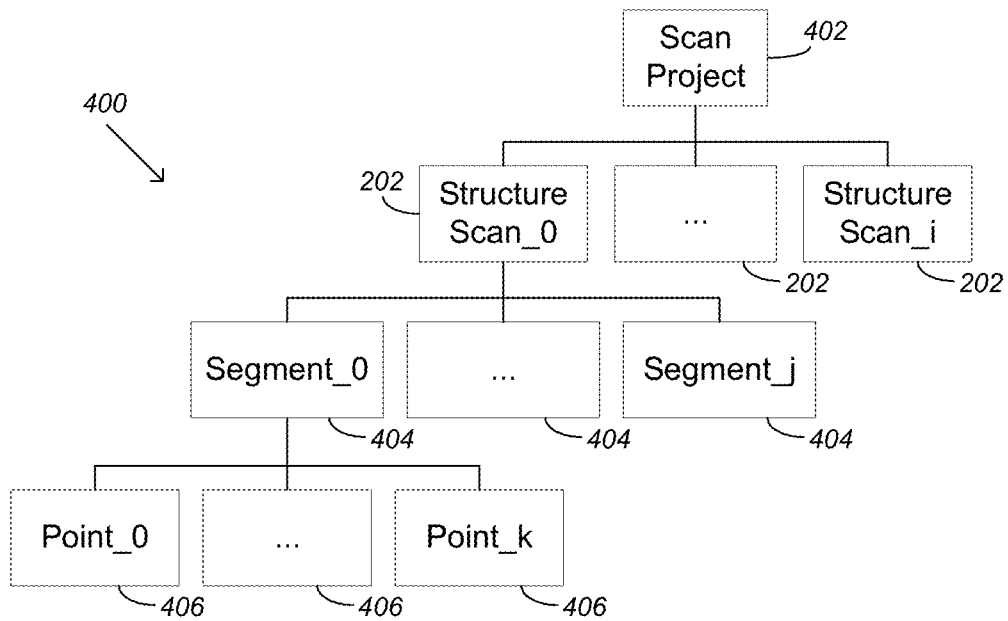
FIG. 4 illustrates a hierarchical data structure of a scan project in accordance with one or more embodiments of the invention.
Figure 5:
FIG. 5 illustrates a segment map for a spherical scan in accordance with one or more embodiments of the invention.

FIG. 4 illustrates a hierarchical data structure of a scan project in accordance with one or more embodiments of the invention. As illustrated, for a scan project 402, there are multiple structured scans 202. Each structured scan may be segmented (via segmenting step 206) into segments 404 where each segment has multiple points 406 that may be utilized to identify similar surface properties of a segment 404. FIG. 5 illustrates a segment map for a spherical scan in accordance with one or more embodiments of the invention. In this segment map of a room, the raw scan points of the room have been grouped into meaningful segments, such as door, ceiling lamp, window etc., which can be further classified with semantic information.

Data Modeling/Incremental Modeling

Overview

Figure 6:
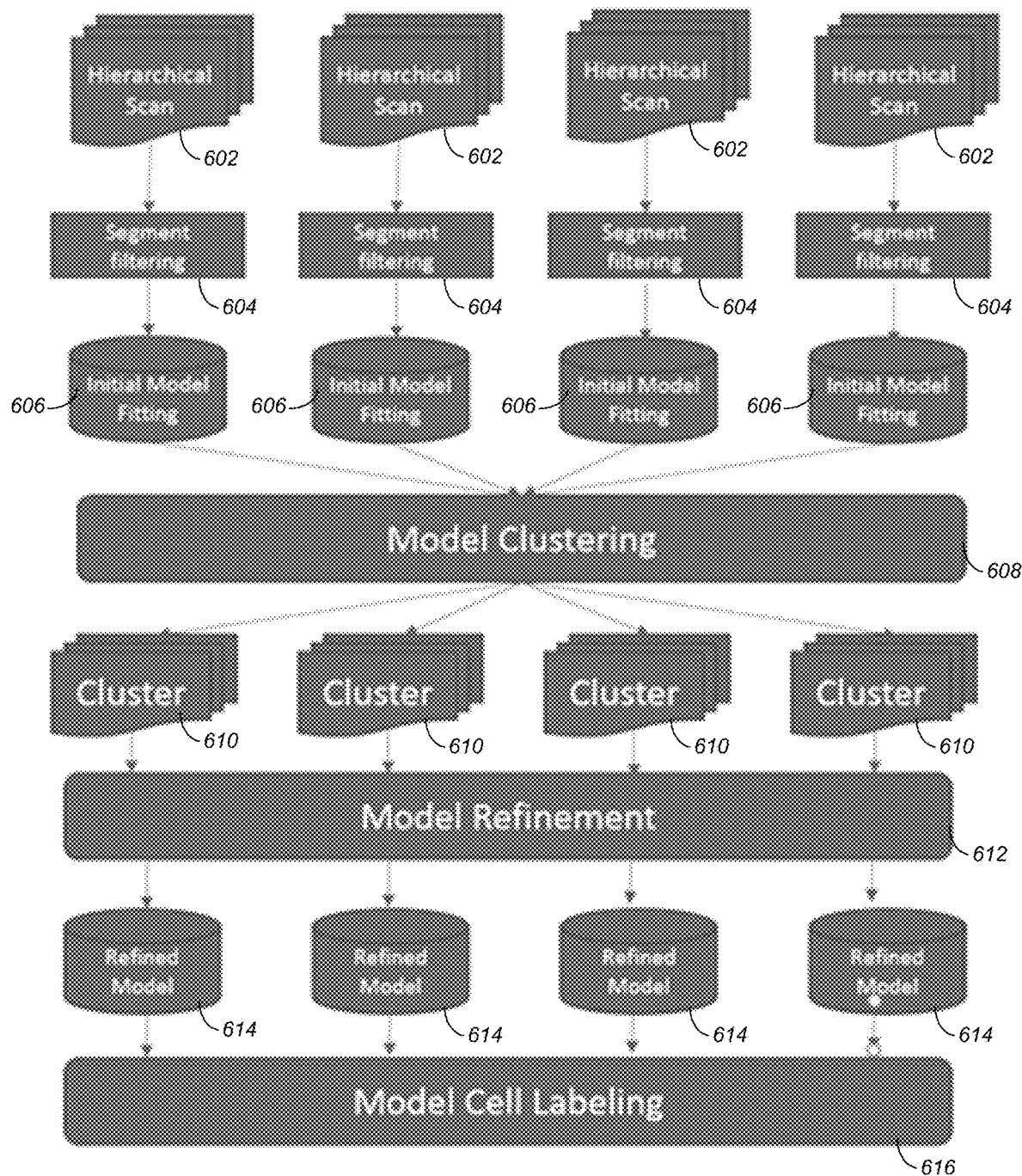
FIG. 6 illustrates an overview of the workflow of creating and incrementally refining a 3D computer-aided design (CAD) model from a point cloud in accordance with one or more embodiments of the invention.

FIG. 6 illustrates an overview of the workflow of creating and incrementally refining a 3D computer-aided design (CAD) model from a point cloud in accordance with one or more embodiments of the invention. As illustrated, the scan data 602 is acquired from two or more structured scans (e.g., spherical laser scans) of a real-world scene. The scan data 602 consists of 3D image data.

To reduce memory requirements and allow the progressive processing of laser scans, only one single (hierarchical) scan 602 is loaded into memory for the initial model extraction at each time. However, multiple scans 602 can be processed in parallel if the computer has more powerful computation capability or a distributed system is utilized. Accordingly, the scan/scan data 602 from each structured scan is processed independently (i.e., from other scans).

To extract the initial candidate models from one scan 602, segment filtering is conducted at 604 where each segment in the scan is modelled in parallel using its best-fitting geometry shape [17] resulting in initial models/initial model fittings 606. Accordingly, the scan data 602 is segmented into multiple segments with each of the multiple segments consisting of a portion of the scan data with similar surface properties. The scan data 602 is filtered 604 for each of the multiple segments and at 606, an initial model is fit to the filtered scan data (the initial model is a model candidate).

The initial models 606 are clustered at 608 (into clusters 610) and refined at 612 using the models 606 from the other scans 602 in the scan project (to produce refined models 614). In other words, the model candidates from the structured scans are clustered into clusters/groups 610 where model candidates in the same cluster/group 610 are likely to be part of the same model. In 612, a refined model 614 is fit onto the model candidates in the same cluster/group 610.

The model cells are labeled at 616. The labeling first consists of mapping a grid (consisting of cells representing points), over the refined model 614. The grid represents a geometric space of the scan data 602 for all of the two or more structured scans. Each cell in the grid is labeled by processing each of the two or more structured scans independently, labeling each cell located within the refined model as occupied, utilizing back projection to label each remaining cell (i.e., cells that are not labeled as occupied) as occluded or empty, and subsequent to the back projection, combining the labels from the structured scans. In addition, based on/as part of the model cell labeling 616, model details may be extracted to further define and complete the refined model.

Segment Filtering 606

Initially, the segments coming from each point cloud data is filtered (at 604) depending on the target model that is going to be extracted. For instance, if the target model consists of regular building elements, then only planar segments may be detected and retained in a buffer. If the target model is a pipe run, planar segments and non-smooth segments can be filtered out and only the left-over segments are used for the subsequent process. Further, in embodiments of the invention, the normal of the scan data is computed and the two or more structured scans are converted into a hierarchical data structure that organizes the structured scans into the multiple segments.

Afterwards, these segments are further filtered to remove noisy or small segments that might decrease the accuracy. Segments can also be filtered based on domain knowledge, for example, the area of a wall segment must be larger than 1 square meter or the radius of a pipe must be larger than 1 inch, etc. Thereafter, an initial model may be fit (i.e., step 606) using the more detailed layers contained in the hierarchical data structure 400. These initial models 606 become a model candidate for the later clustering step 608.

Accordingly, the filtering may filter the scan 602 data for each of the multiple segments based on a target model to be extracted and then further filter the scan data 602 for each of the multiple segments to remove scan data likely to decrease accuracy of the model to be extracted.

Segment Clustering 608 and Model Refinement 612

Segment/model clustering 608 (into cluster 610) and model refinement 612 can be performed based on the extracted model candidates (i.e., from the initial model fitting 606). Thus, raw information such as points, normal, intensity and segment maps can be unloaded from memory temporarily to reduce memory consumption.

Various clustering criteria may be utilized to perform the model/segment clustering at 608. All the candidates (i.e., candidate geometry/segments) from different point clouds/scans 602 are collected and clustered into groups 610 in which the candidates in the same group are likely to be a part of the same model.

Figure 7:
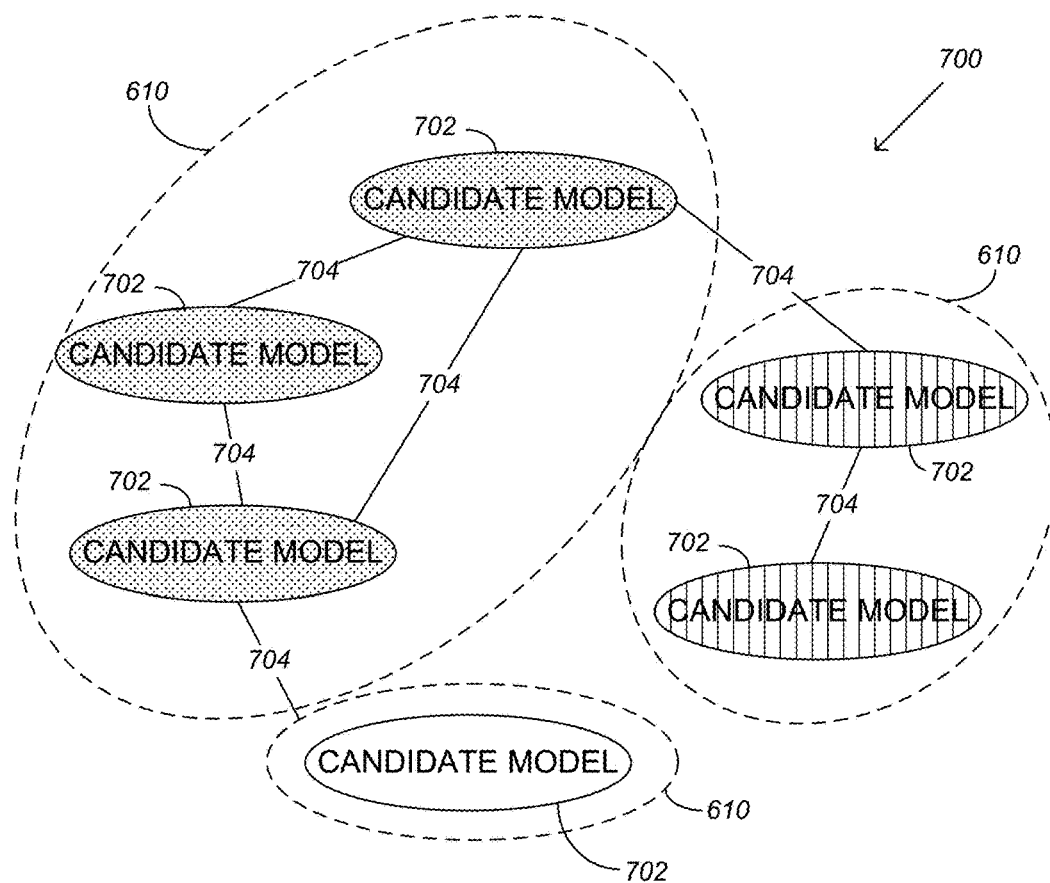
FIG. 7 illustrates a candidate model clustering graph based on a similarity function in accordance with one or more embodiments of the invention.

For clustering 608, a graph may be used. FIG. 7 illustrates a candidate model clustering graph 700 based on a similarity function in accordance with one or more embodiments of the invention. In the graph 700, the nodes 702 are model candidates fitted from single segments, and edges 704 are defined using a weight (similarity) function depending on the model. The similar candidate models 702 are thus placed into clusters 610. The clustering step 608 is primarily to discover the global similarity among the model candidates 702, which is more robust compared with fitting primitives to individual segments.

Accordingly, in embodiments of the invention, a graph is generated in which nodes of the graph are the model candidates fitted from a single segment, and edges of the graph are defined using a weight function. A determination is then made regarding which model candidates are in the same group based on the graph. The group determination may consist of splitting the graph based on a variance between the model candidates, wherein the variance may be a variance threshold (e.g., based on a defined threshold of variance between the model candidates).

In one example, a wall model may use a weight similarity function based on the following items/criteria:
 surface normal;
 spatial proximity; and
 plane-to-wall distances.

In another example, the similarity of pipes may use a weighted similarity function based on the following items/criteria:
 radii of the candidate cylinders;
 collinearity of the principal directions of the candidate cylinders; and
 closest distance between the points on the candidate cylinders.

Afterwards, disjointed-sets are created by splitting the graph 700 into low variance components. For example, as illustrated in FIG. 7, the graph 700 may be split into the three disjointed sets/clusters 610.

Once clustered in step 608, the clustered models 610 may be refined in step 612. Thus, as a last iteration, a refined model 614 may be fit onto the candidates 702 in the same set 610 to extract the best model for all the candidates 702.

Model Completion

Each disjoint-set/cluster 610 represents a unified 3D model since it is composed of similar model candidates 702. However, unified models are usually missing many regions due to occlusion or simply empty regions. Therefore, embodiments of the invention identify missing regions as truly empty or merely occluded for further operations such as opening classification, holes filling, shape fitting, etc.

Figure 8:
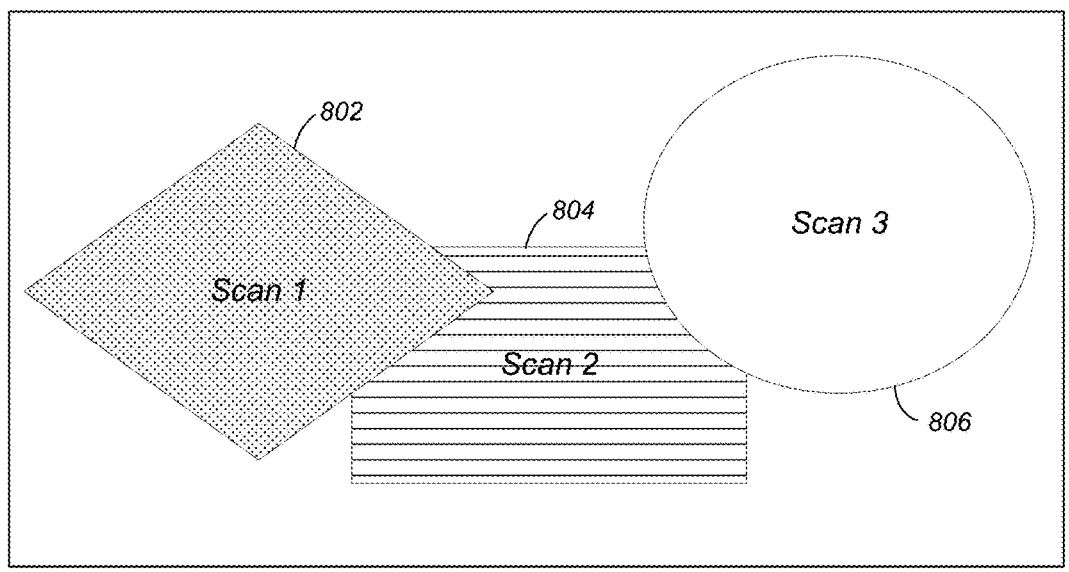
FIG. 8 illustrates an example of a unified planar model that is created from the points from its visible scans in accordance with one or more embodiments of the invention.

To identify the missing regions, occupancy labeling is utilized. Once the 3D models are extracted, the models are split into smaller cells for occupied/occluded/empty identification. At this stage, the labeling is performed for each individual scan. First the data is loaded for one single laser scan, and afterwards, the labeling result is unified. To improve performance, in one or more embodiments, visible scans for each 3D model are collected and cell back-projection is only performed for its visible scans. FIG. 8 illustrates an example of a unified planar model that is created from the points from its visible scans. Note that FIG. 8 is just an example for a planar model, other non-planar models (e.g., 3D models) may also be utilized in accordance with embodiments of the invention. The wall model is only visible to scan1 802, scan 2 804 and scan 3 806.

All the points in the segments corresponding with the candidate models 702 may be located on the refined model 614, so the contour of contributing segments is projected to the 3D model and all the cells inside the contour are labeled as occupied using a flood filling technique. Such an approach may greatly improve the performance of cell labeling. Thereafter, one only needs to check those non-occupied cells using a back-projection method to determine the occupancy label.

Figure 9A:
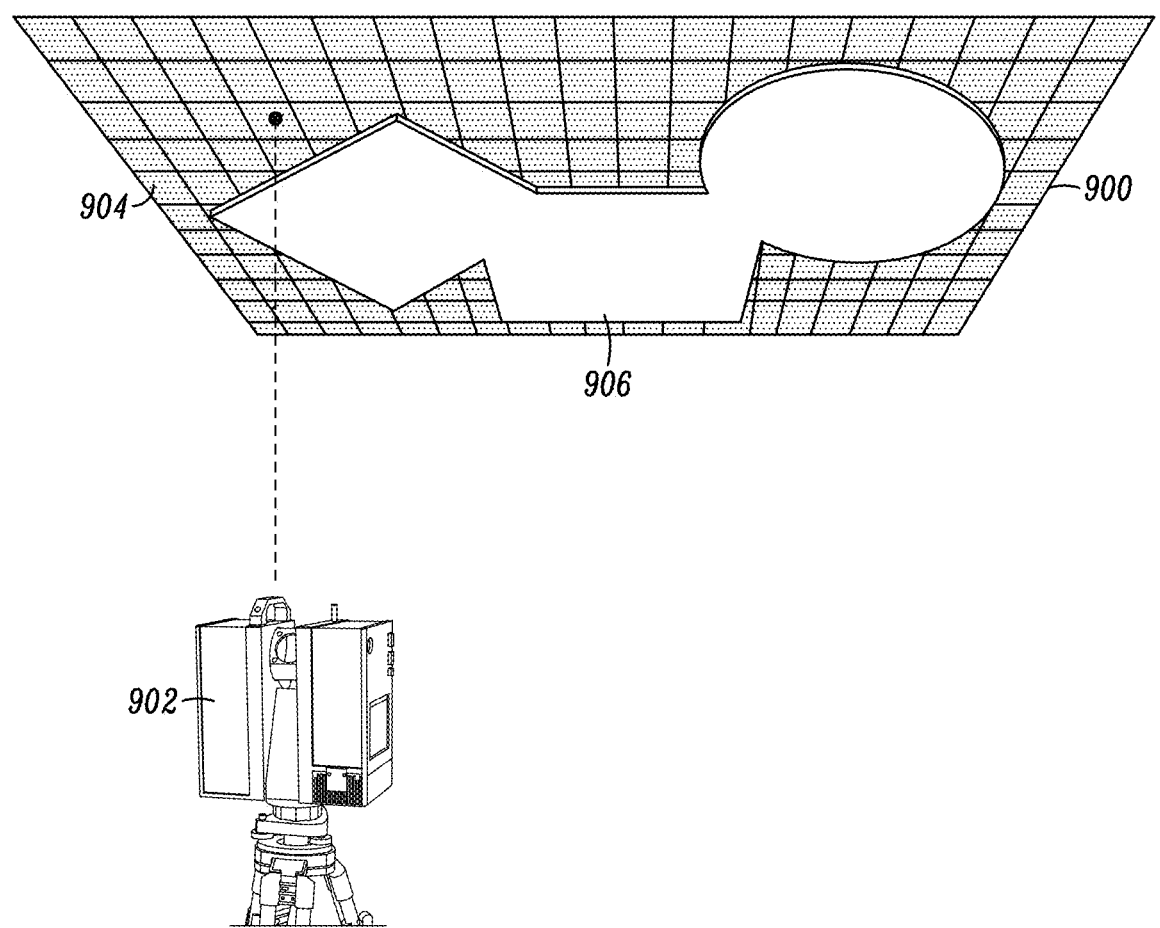
FIGS. 9A and 9B illustrate occupancy labeling for each cell on a model using back-projection in accordance with one or more embodiments of the invention.
Figure 9B:
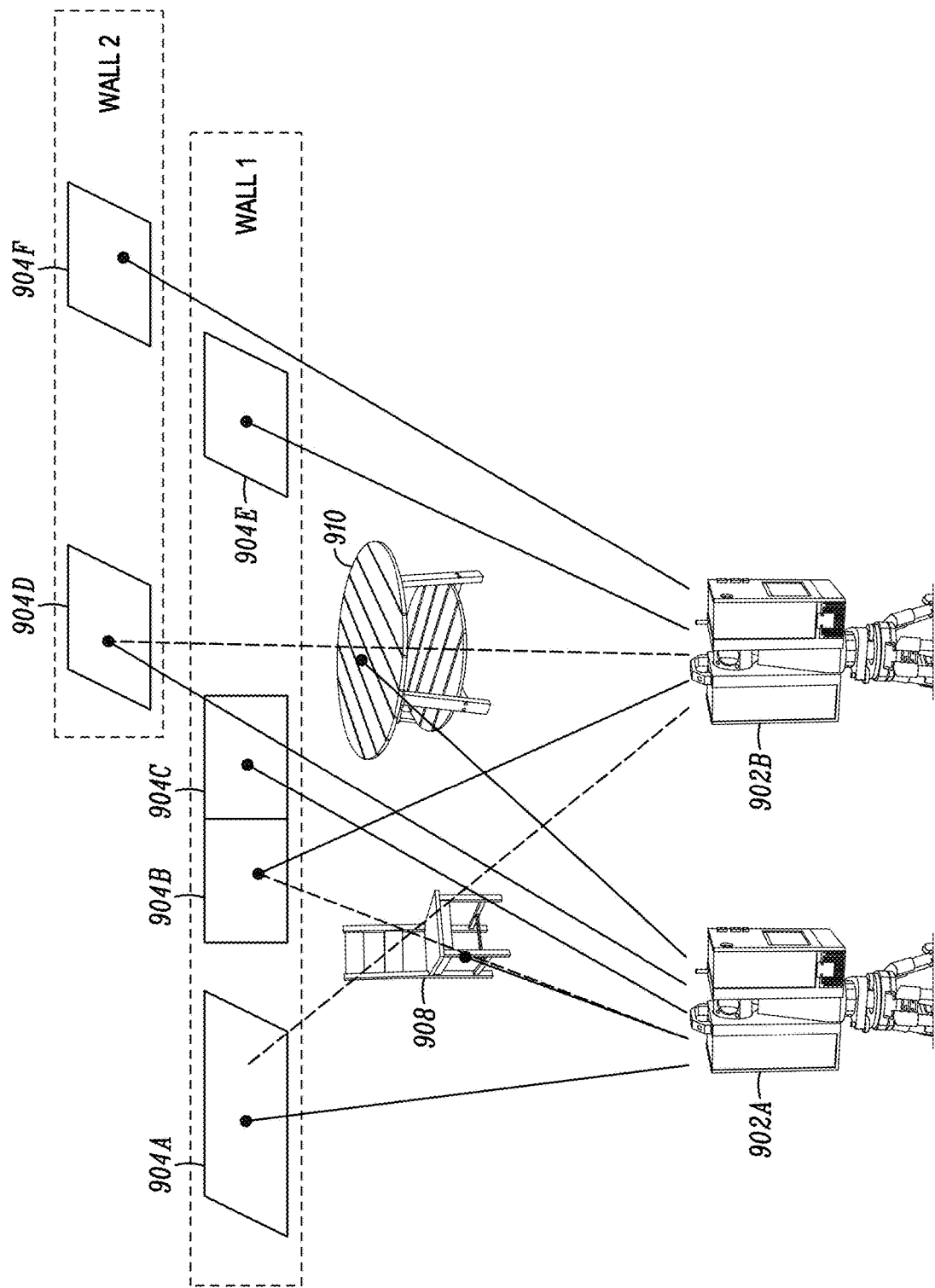

FIGS. 9A and 9B illustrate occupancy labeling for each cell on a model using back-projection in accordance with one or more embodiments of the invention. As illustrated in FIGs, 8, 9A, and 9B, the laser scans 802-806 of FIG. 8 are loaded. Since the scans 802-806 are structured scans, the distance from the scanner 902 and the planar surface 900 is known. Accordingly, the clustering of the different scans 802-806 may be performed to provide a unified planar model as illustrated in FIG. 9A. In this regard, all of the points in the segments/scans 802-806 corresponding with the candidate models are located on the refined model and the contour (i.e., boundary) of the combined contributing segments 906 are projected to the 3D model 900. The cells inside the contour 906 are labeled as occupied using the flood filling technique. In other words, the labeling of each cell located within the refined model as occupied consists of determining a contour of the multiple segments that contribute to the refined model, and labeling each cell located within the contour as occupied using a flood filling technique.

The non-occupied cells 904 must then be checked using a back-projection method. Referring to FIGS. 9A and 9B, for those non-occupied cells 904, each cell 904 of a 3D model is back-projected into the visible scans by back tracing a ray from the scanner 902 origins to the center of the cell 904 and then searching for its closest neighbors in the scan. The cell 904 is labeled using the following rules:
 If the neighbors are behind the cell 904, then the cell is labeled as empty since a scan can see through a cell 904.
 If the neighbors are in front of the cell 904 for all the scans then the cell is labeled as occluded.

After this kind of back tracing, there may be several labels for one cell 904. FIG. 9B illustrates the combination of labels from multiple visible scans in accordance with one or more embodiments of the invention. Specifically, the different cells 904A-904F (collectively referred to as cells 904) may have different labels from different scans (i.e., scans from scanners 902A and 902B [collectively referred to as scanners 902]). For example, cell 904A may be labeled as occupied or empty based on the scan from scanner 902A.

However, the chair 908 occludes the view of cell 904A from scanner 902B. Similarly, cell 904D may be labeled as occupied or empty based on a scan from scanner 902A while cell 904D is occluded by the table 910 from scanner 902B. Embodiments of the invention combine the labels to obtain the final labeling result. In this regard:

A cell 904 is marked/labeled as occluded only when it is occluded by every scan.

A cell 904 is marked/labeled as empty if it can be seen through by any scan.

With the above rules in place, it may be seen that cell 904A is not occluded by every scan—the scan from scanner 902A reaches cell 904A while the scan from scanner 902B is occluded by chair 908. As the scan from scanner 902A identifies an object, it is marked as occupied. Similar examples may be seen by cells 904B, 904C, 904D, 904E, and 904F (none of the cells are occluded by both scans but instead at least one scan reaches the cells and identifies an object—and accordingly, each of the cells 904A-904F are marked as occupied). Further note, if a cell is reached by at least one scan and can be seen through, it may be labeled as empty (e.g., the area to the left of cell 904A on Wall 1, the area to the right of cell 904E on Wall 1, and/or the area to the right of cell 904F on Wall 2). In this manner, the scans/labels are combined.

Figure 10:
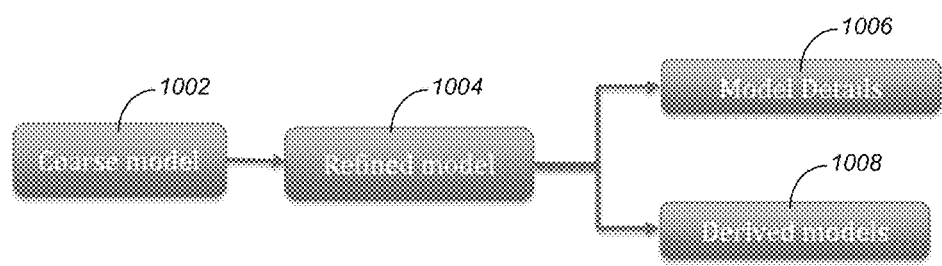
FIG. 10 illustrates a model completion workflow in accordance with one or more embodiments of the invention.

In view of the above, FIG. 10 illustrates a model completion workflow in accordance with one or more embodiments of the invention. The coarse model 1002 is refined into the refined model 1004. With the refined model 1004 and labeled model cell information, model detail information 1006 and/or derived models 1008 can be further extracted from the point cloud.

Figure 11:
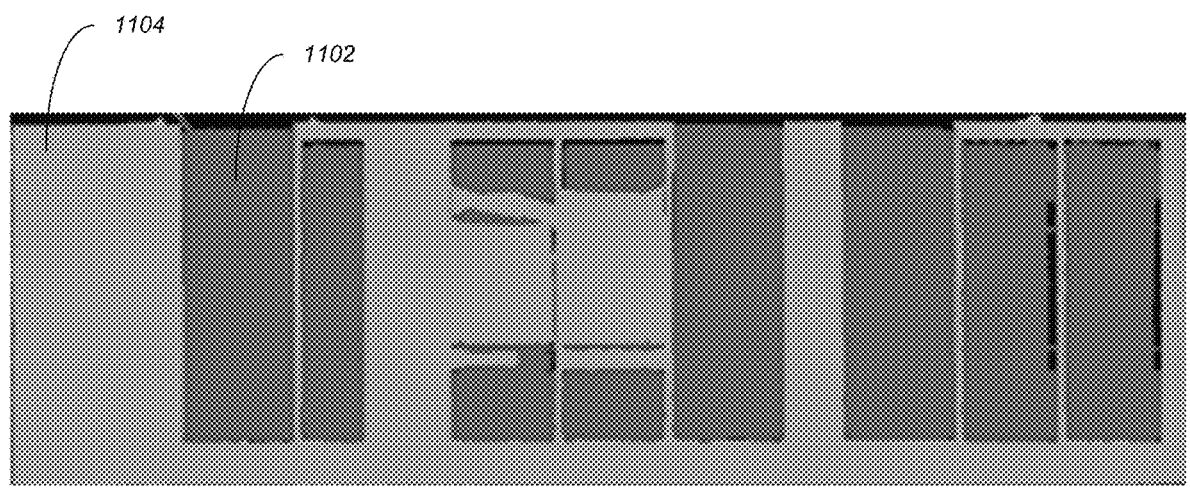
FIG. 11 illustrates an exemplary occupancy map of a wall model in accordance with one or more embodiments of the invention.

The labeling information helps the model creation by introducing the occluded regions that might be interpolated towards a more complete model. FIG. 11 illustrates an exemplary occupancy map of a wall model in accordance with one or more embodiments of the invention. Different colors/patterns may be used to reflect whether a cell is occupied, empty, or occluded. For example, a first color (e.g., red) may reflect whether a cell is empty, a second color/pattern (e.g., green) may reflect whether a cell is occluded, a third color/pattern (e.g., blue) may reflect whether a cell is occupied, and a fourth color/pattern (e.g., yellow) may reflect the distance to the surface of the scanned object (e.g., whether a scanned object is close to the surface). As illustrated in FIG. 11, in a BIM (building information model) application, the opening information (such as doors and windows) may be extracted from the empty cells marked as shaded/red 1102. Furthermore, model connections and 2D layout can be derived from 3D models through intersection and projection of the 3D models. In FIG. 11, area 1104 shows occupied cells, areas 1102 show empty cells that can see through.

Accordingly, as described above, back projection may consist of multiple steps. Initially, a ray may be back traced from a scanner origin to a center of the cell being labeled. The system may then search for neighbors (for the cell being labeled) in the structured scan being processed. If the neighbors are behind the cell being labeled, the cell is labeled as empty. However, if the neighbors are in front of the cell being labeled, then the cell is labeled as occluded. In addition, during the process of combining the labels from the multiple scans, a cell is labeled as occluded only when the cell is labeled as occluded from all of the two or more structured scans. Further, a cell is labeled as empty if the cell is labeled as empty by any of the two or more scans.

Lastly, as described herein, the extraction of model details may introduce occluded regions to the refined model by interpolating the model details.

Exemplary Applications

Floor Plan Modeling

Figure 12:
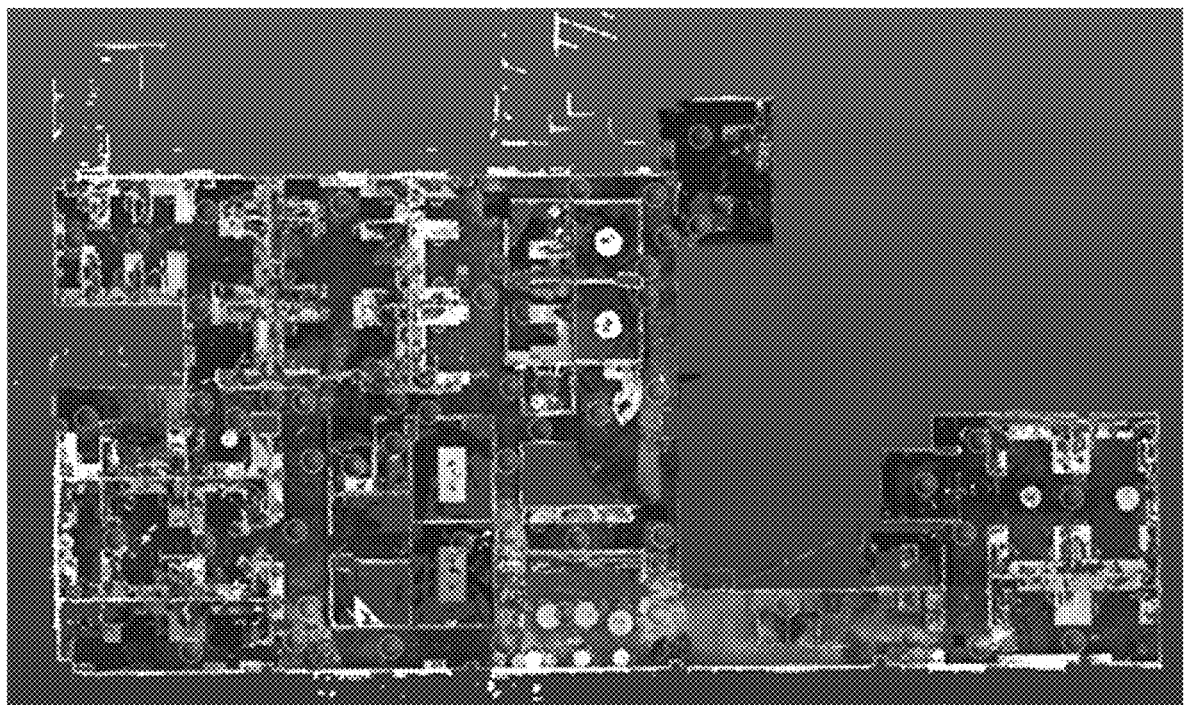
FIGS. 12-14 show the experimental result of wall modeling from a laser scan project of an office building in accordance with one or more embodiments of the invention.
Figure 13:
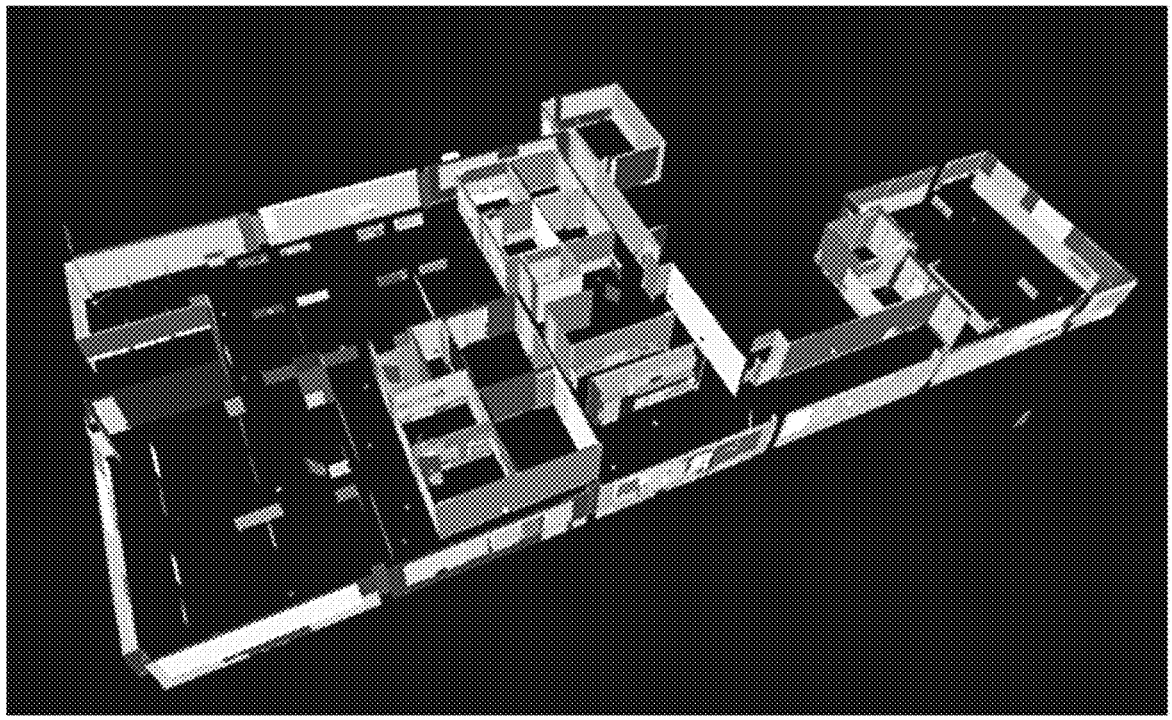
Figure 14:
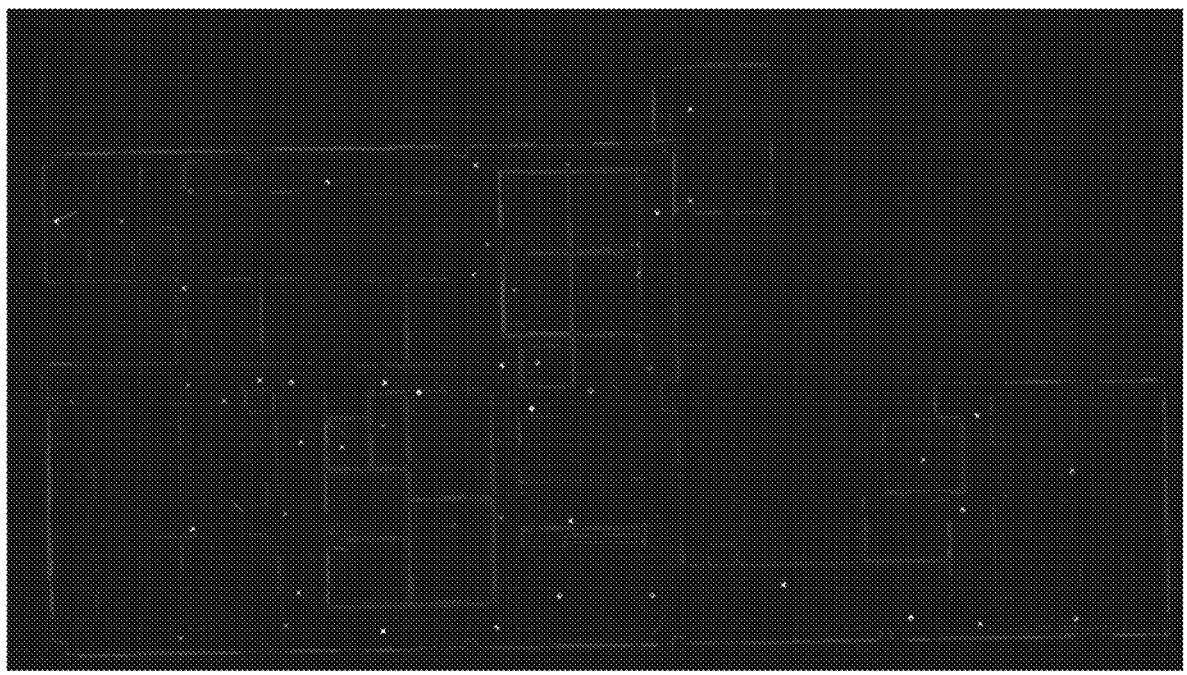

FIGS. 12-14 show the experimental result of wall modeling from a laser scan project of an office building in accordance with one or more embodiments of the invention. There are totally 54 scans in this project, each scan with around 8 million points. FIG. 12 illustrates a point cloud acquired from the scans of the project. FIG. 13 illustrates the 3D wall model created based on the point cloud of FIG. 12. The 3D wall model is incrementally refined by loading more scans. After the wall model of FIG. 13 is created, intersection lines and 2D floor plan lines are created from the wall models, as illustrated in FIG. 14. Meanwhile, opening structures such as windows and doors can be extracted from the occupancy cells labeled on the wall model. It takes approximately 257 seconds in total to generate the refined 3D model of FIG. 13, including the wall surface, feature lines, the projected 2D floor plan result (of FIG. 14) and the boundary of the opening structure.

Pipe Modeling

Figure 15:
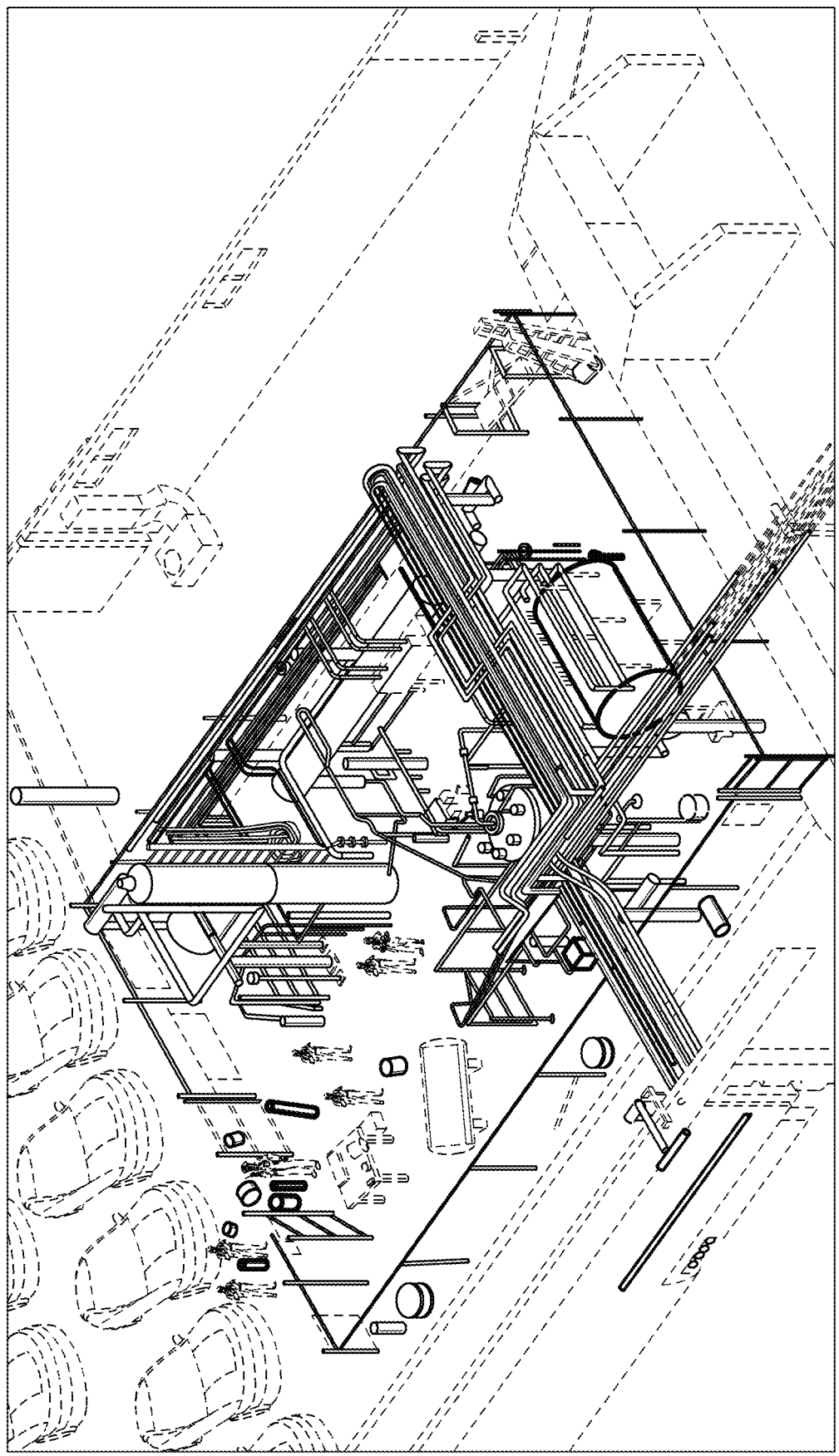
FIGS. 15-16 illustrate the experimental result of pipe modeling from a laser scan project of a plant site in accordance with one or more embodiments of the invention.
Figure 16:
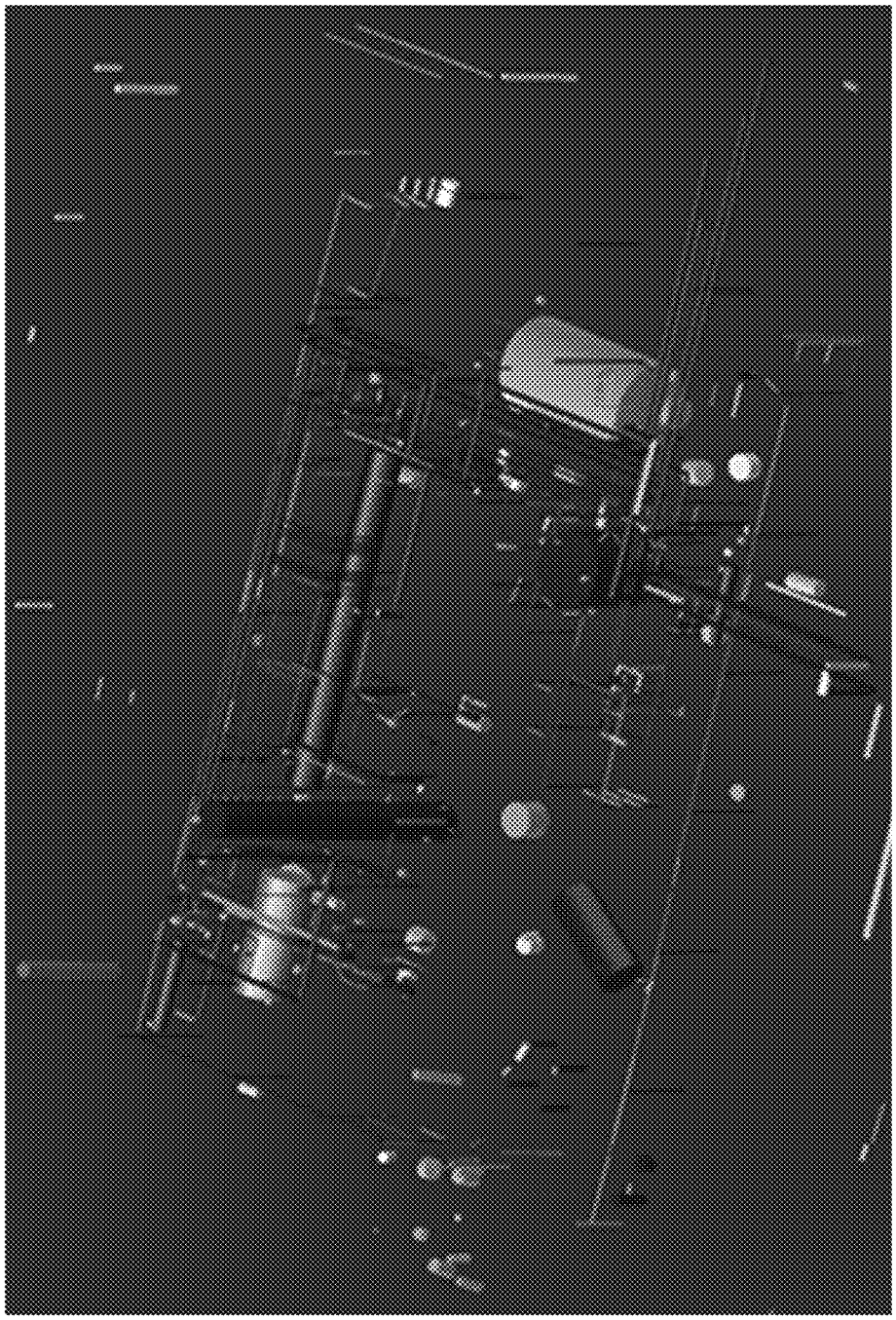

FIGS. 15-16 illustrate the experimental result of pipe modeling from a laser scan project of a plant site in accordance with one or more embodiments of the invention. The can project/point cloud is illustrated in FIG. 15. There are a total of 22 scans in this project, each scan with around 50 million points. The 3D pipe model of FIG. 16 is incrementally refined by loading more scans. After the straight pipe model is created using embodiments of the invention, intersections between the pipes can also be automatically computed and then connection components such as elbows and T-junctions can be modelled (e.g., in a 3D plant design application such as AUTOCAD PLANT).

Hardware Environment

Figure 17:
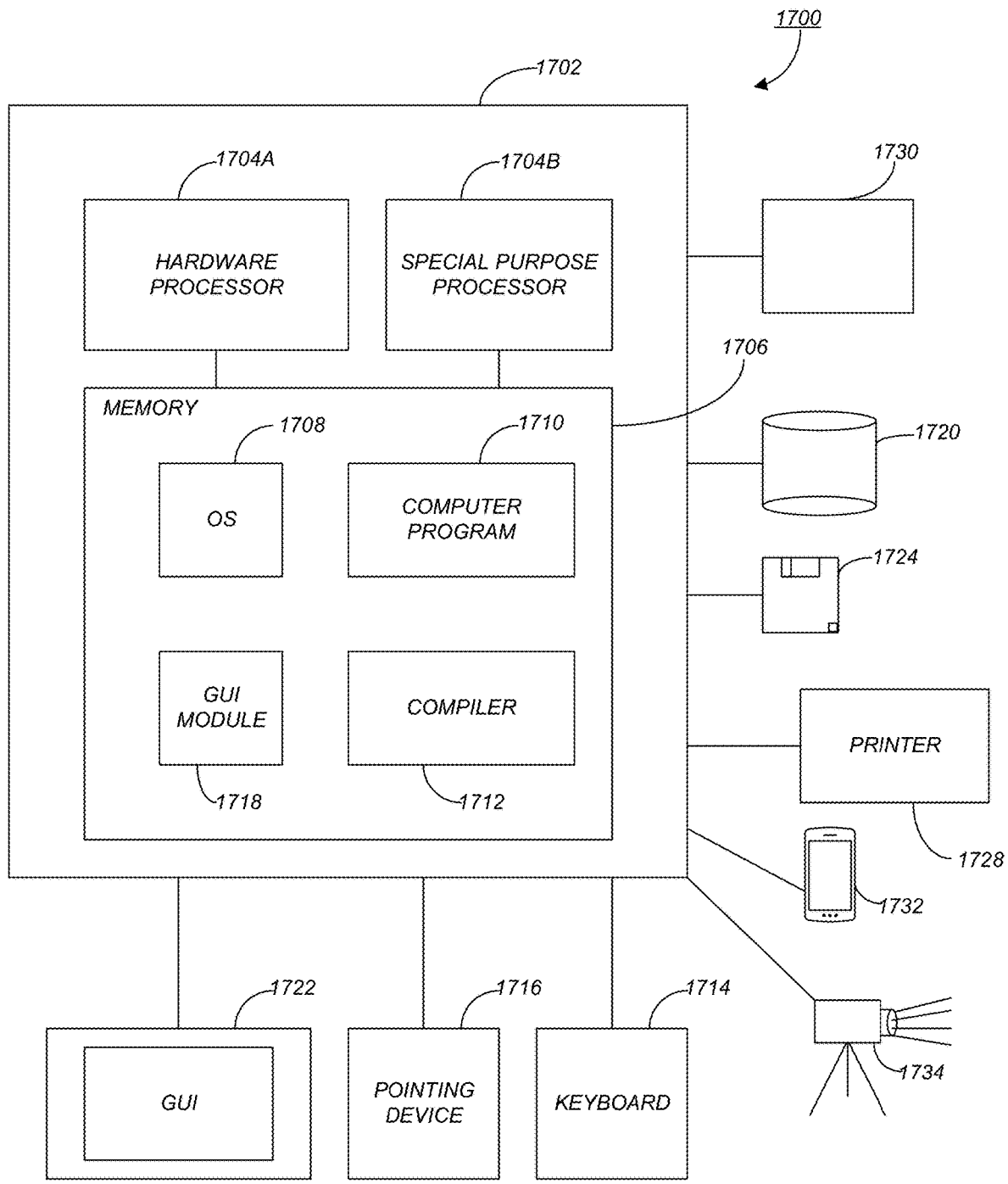
FIG. 17 is an exemplary hardware and software environment used to implement one or more embodiments of the invention.

FIG. 17 is an exemplary hardware and software environment 1700 used to implement one or more embodiments of the invention. The hardware and software environment include a computer 1702 and may include peripherals. Computer 1702 may be a user/client computer, server computer, or may be a database computer. The computer 1702 comprises a hardware processor 1704A and/or a special purpose hardware processor 1704B (hereinafter alternatively collectively referred to as processor 1704) and a memory 1706, such as random access memory (RAM). The computer 1702 may be coupled to, and/or integrated with, other devices, including input/output (I/O) devices such as a keyboard 1714, a cursor control device 1716 (e.g., a mouse, a pointing device, pen and tablet, touch screen, multi-touch device, etc.) and a printer 1728. In one or more embodiments, computer 1702 may be coupled to, or may comprise, a portable or media viewing/listening device 1732 (e.g., an MP3 player, IPOD, NOOK, portable digital video player, cellular device, personal digital assistant, etc.). In yet another embodiment, the computer 1702 may comprise a multi-touch device, mobile phone, gaming system, internet enabled television, television set top box, or other internet enabled device executing on various platforms and operating systems.

In one or more embodiments, computer 1702 may be coupled to, and/or integrated with, a laser scanning device 1734. Such a laser scanning device 1734 is configured to scan an object or urban environment and obtain a digital representative of such an object/environment in the form of point cloud data that may be processed by the computer 1702. Exemplary laser scanning devices 1734 include terrestrial scanners (e.g. operated by hand or attached to a mobile device such as an automobile) as well as satellite based scanners. Further, embodiments of the invention may utilize structured scanners (e.g., with known positioning information) such as spherical laser scanners.

In one embodiment, the computer 1702 operates by the hardware processor 1704A performing instructions defined by the computer program 1710 under control of an operating system 1708. The computer program 1710 and/or the operating system 1708 may be stored in the memory 1706 and may interface with the user and/or other devices to accept input and commands and, based on such input and commands and the instructions defined by the computer program 1710 and operating system 1708, to provide output and results.

Output/results may be presented on the display 1722 or provided to another device for presentation or further processing or action. In one embodiment, the display 1722 comprises a liquid crystal display (LCD) having a plurality of separately addressable liquid crystals. Alternatively, the display 1722 may comprise a light emitting diode (LED) display having clusters of red, green and blue diodes driven together to form full-color pixels. Each liquid crystal or pixel of the display 1722 changes to an opaque or translucent state to form a part of the image on the display in response to the data or information generated by the processor 1704 from the application of the instructions of the computer program 1710 and/or operating system 1708 to the input and commands. The image may be provided through a graphical user interface (GUI) module 1718. Although the GUI module 1718 is depicted as a separate module, the instructions performing the GUI functions can be resident or distributed in the operating system 1708, the computer program 1710, or implemented with special purpose memory and processors.

In one or more embodiments, the display 1722 is integrated with/into the computer 1702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITHC, PLAYSTATION PORTABLE, etc.), touch tables, and walls (e.g., where an image is projected through acrylic and/or glass, and the image is then backlit with LEDs).

Some or all of the operations performed by the computer 1702 according to the computer program 1710 instructions may be implemented in a special purpose processor 1704B. In this embodiment, some or all of the computer program 1710 instructions may be implemented via firmware instructions stored in a read only memory (ROM), a programmable read only memory (PROM) or flash memory within the special purpose processor 1704B or in memory 1706. The special purpose processor 1704B may also be hardwired through circuit design to perform some or all of the operations to implement the present invention. Further, the special purpose processor 1704B may be a hybrid processor, which includes dedicated circuitry for performing a subset of functions, and other circuits for performing more general functions such as responding to computer program 1710 instructions. In one embodiment, the special purpose processor 1704B is an application specific integrated circuit (ASIC).

The computer 1702 may also implement a compiler 1712 that allows an application or computer program 1710 written in a programming language such as C, C++, Assembly, SQL, PYTHON, PROLOG, MATLAB, RUBY, RAILS, HASKELL, or other language to be translated into processor 1704 readable code. Alternatively, the compiler 1712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1710 accesses and manipulates data accepted from I/O devices and stored in the memory 1706 of the computer 1702 using the relationships and logic that were generated using the compiler 1712.

The computer 1702 also optionally comprises an external communication device such as a modem, satellite link, Ethernet card, or other device for accepting input from, and providing output to, other computers 1702.

In one embodiment, instructions implementing the operating system 1708, the computer program 1710, and the compiler 1712 are tangibly embodied in a non-transitory computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of computer program 1710 instructions which, when accessed, read and executed by the computer 1702, cause the computer 1702 to perform the steps necessary to implement and/or use the present invention or to load the program of instructions into a memory 1706, thus creating a special purpose data structure causing the computer 1702 to operate as a specially programmed computer executing the method steps described herein. Computer program 1710 and/or operating instructions may also be tangibly embodied in memory 1706 and/or data communications devices 1730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1702.

Figure 18:
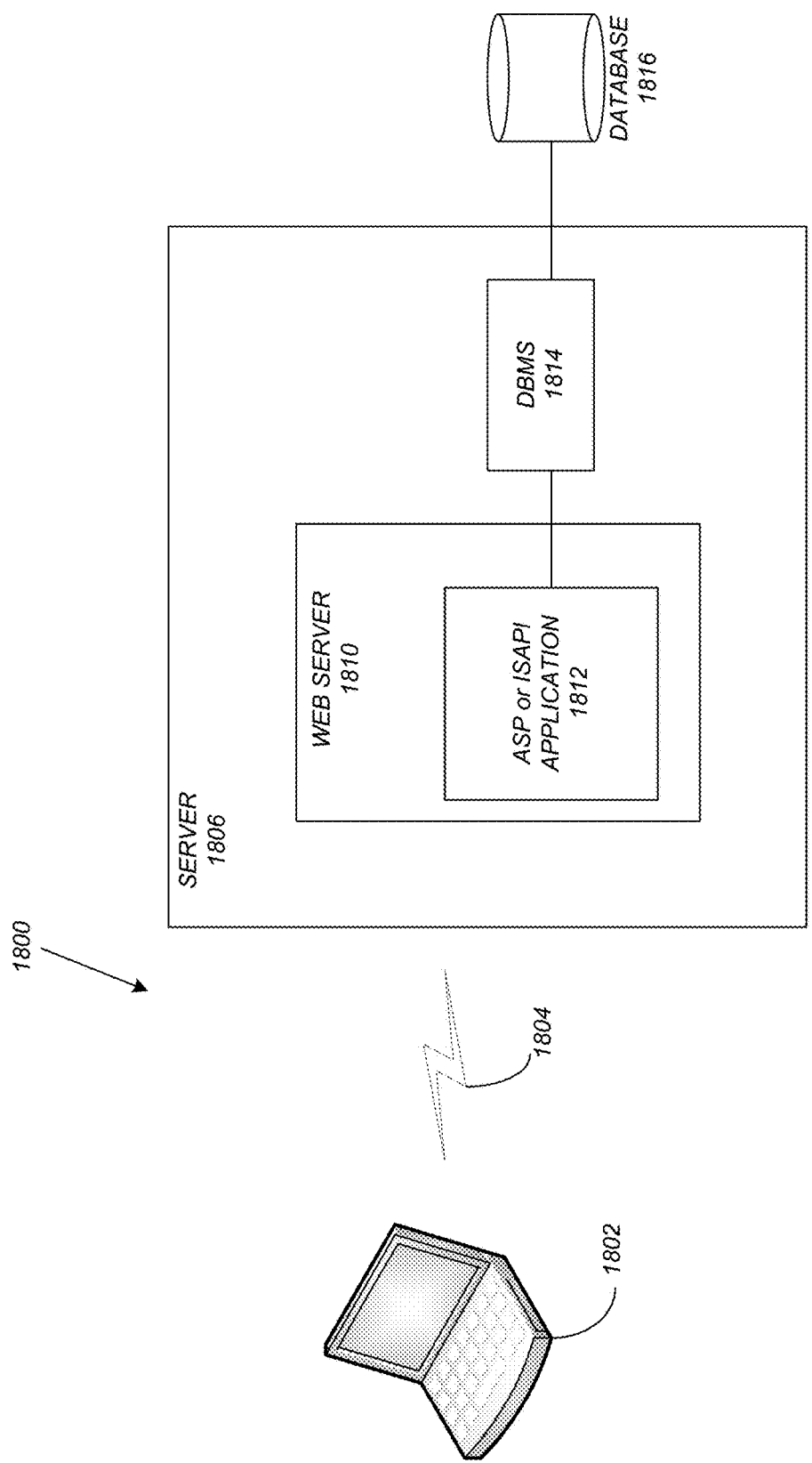
FIG. 18 schematically illustrates a typical distributed/cloud-based computer system using a network to connect client computers to server computers in accordance with one or more embodiments of the invention.

FIG. 18 schematically illustrates a typical distributed/cloud-based computer system 1800 using a network 1804 to connect client computers 1802 to server computers 1806. A typical combination of resources may include a network 1804 comprising the Internet, LANs (local area networks), WANs (wide area networks), SNA (systems network architecture) networks, or the like, clients 1802 that are personal computers or workstations (as set forth in FIG. 17), and servers 1806 that are personal computers, workstations, minicomputers, or mainframes (as set forth in FIG. 17). However, it may be noted that different networks such as a cellular network (e.g., GSM [global system for mobile communications] or otherwise), a satellite based network, or any other type of network may be used to connect clients 1802 and servers 1806 in accordance with embodiments of the invention.

A network 1804 such as the Internet connects clients 1802 to server computers 1806. Network 1804 may utilize ethernet, coaxial cable, wireless communications, radio frequency (RF), etc. to connect and provide the communication between clients 1802 and servers 1806. Further, in a cloud-based computing system, resources (e.g., storage, processors, applications, memory, infrastructure, etc.) in clients 1802 and server computers 1806 may be shared by clients 1802, server computers 1806, and users across one or more networks. Resources may be shared by multiple users and can be dynamically reallocated per demand. In this regard, cloud computing may be referred to as a model for enabling access to a shared pool of configurable computing resources.

Clients 1802 may execute a client application or web browser and communicate with server computers 1806 executing web servers 1810. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1802 may be downloaded from server computer 1806 to client computers 1802 and installed as a plug-in or ACTIVEX control of a web browser. Accordingly, clients 1802 may utilize ACTIVEX components/component object model (COM) or distributed COM (DCOM) components to provide a user interface on a display of client 1802. The web server 1810 is typically a program such as MICROSOFT'S INTERNET INFORMATION SERVER.

Web server 1810 may host an Active Server Page (ASP) or Internet Server Application Programming Interface (ISAPI) application 1812, which may be executing scripts. The scripts invoke objects that execute business logic (referred to as business objects). The business objects then manipulate data in database 1816 through a database management system (DBMS) 1814. Alternatively, database 1816 may be part of, or connected directly to, client 1802 instead of communicating/obtaining the information from database 1816 across network 1804.

When a developer encapsulates the business functionality into objects, the system may be referred to as a component object model (COM) system. Accordingly, the scripts executing on web server 1810 (and/or application 1812) invoke COM objects that implement the business logic. Further, server 1806 may utilize MICROSOFT'S TRANSACTION SERVER (MTS) to access required data stored in database 1816 via an interface such as ADO (Active Data Objects), OLE DB (Object Linking and Embedding DataBase), or ODBC (Open DataBase Connectivity).

Generally, these components 1800-1816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1802 and 1806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1802 and 1806. In view of the above, embodiments of the invention may be implemented as a software application on a client 1802 or server computer 1806. Further, as described above, the client 1802 or server computer 1806 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide a fully automatic 3D model creation method from laser scanning data and the model can be progressively refined with the incremental of available laser scans. The 3D model is created based on the global similarity criterion, thus is more robust to noise and outliers. Since embodiments of the invention may only require one scan to be loaded at a time, high resolution of laser scans can be used to improve model quality. Moreover, large scale projects can be successfully handled compared with other prior work on model reconstruction from point cloud data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Bernardini, F. Mittleman, J., Rushmeier, H., Silva, C., Taubin, G.: The ball pivoting algorithm for surface reconstruction. IEEE Transactions on Visualization and computer Graphics 5 (4), 349-359 (1999);

[2] Schnabel, R., Degener, P., Klein, R.: Completion and reconstruction with primitive shapes. Computer Graphics Forum (2009);

[3] Qiu R., Zhou, Q.Y., Nemann U., Pipe-Run Extraction and Reconstruction from Point Clouds, Computer Vision—ECCV 2014, 17-30 (2014);

[4] Fu , Y Z hu , X ., Yan g, J., Yu an , Z .: Pipe reconstruction from unorganized point cloud data, U.S. Pat. No. 8,605,093;

[5] Mitsubishi Electric Research Laboratories, Inc. Method for Fitting Primitive Shapes to 3D Point Clouds Using Distance Fields, US20150006126;

[6] Oytun Akman, Ronald Poelman, Seth Koterba, Automatic Registration, U.S. Patent Application 20150154199

[7] Hui Huang, Shihao Wu, Minglun Gong, Matthias Zwicker, Daniel Cohen-or, Three-dimensional point cloud model reconstruction method, computer readable storage medium and device, US20170193692 A1

[8] Jeffery D. LEWIS, Jeffrey C. TAYLOR, System and method for generating computerized models of structures using geometry extraction and reconstruction techniques, WO2017100658 A1

[9] Ochmann S., Vock, R., Wessel, R. and. Klein, R. 2016. Automatic reconstruction of parametric building models from indoor point clouds. *Computers & Graphic,* 54, pp. 94-103.

[10] J. Jung, S. Hong, S. Jeong, S. Kim, H. Cho, S. Hong, J. Heo, Productive modeling for development of as-built {BIM} of existing indoor structures, Automat. Construct. 42 (0) (2014) 68-77.

[11] Srivathsan Murali, Pablo Speciale, Martin R. Oswald, Marc Pollefeys. Indoor Scan2BIM: Building Information Models of House Interiors. IEEE/RSJ International Conference on Intelligent Robots and Systems (IROS), Sep. 24-28, 2017.

[12] B.Okorn, X.Xiong, B.Aknci, and D.Huber, "Toward automated modeling of floor plans", in Proceedings of the Symposium on 3D Data Processing, Visualization and Transmission, Vol.2, 2010

[13] A.Adan and D.Huber, "3D reconstruction of interior wall surfaces under occlusion and clutter", in 3D imaging, modeling, processing, Visualization and Transmission (3DIMPVT), 2011 International Conference on IEEE 2011, pp. 275-281

[14] Bassier, Maarten & Vergauwen, Maarten & Van Genechten, Bjorn. (2016). Automated Semantic Labeling of 3D Vector Models for Scan-to-BIM. 10.5176/2301-394X ACE16.83.

[15] Fu, Yan, Building datum extraction from laser scanning data, US Patent Application US20150063683 A1

[16] Ronald POELMAN, Oytun Akman, Pre-segment point cloud data to run real-time shape extraction faster, US Patent US9508186 B2

[17] Yan Fu, Jin Yang, Xiaofeng Zhu, Zhenggang Yuan, Primitive quadric surface extraction from unorganized point cloud data, US20110304619 A1

What is claimed is:

1. A computer-implemented method for creating a three-dimensional computer-aided design (CAD) model, comprising:
   (a) acquiring scan data from two or more structured scans of a real-world scene with a known scan position, wherein the scan data comprises three-dimensional (3D) image data;
   (b) processing the scan data from each of the two or more structured scans by:
      (1) segmenting the scan data into multiple segments, wherein each of the multiple segments comprises a portion of the scan data with one or more similar surface properties;
      (2) fitting an initial model to the scan data, wherein the initial model comprises a model candidate;
   (c) clustering the model candidates from the two or more structured scans into groups, wherein the model candidates in a same group are likely to be part of a same model;
   (d) refining the clustered model candidates based on the model candidates in the same group resulting in a refined model;
   (e) mapping a geometric space, comprising cells, over the refined model;
   (f) labeling each of the cells in the geometric space by:
      (1) labeling each cell located within the refined model as occupied;
      (2) utilizing back projection to label each non-occupied cell; and
      (3) subsequent to the back projection, combining the labels from the two or more structured scans; and
   (g) based on the labeling, further defining the refined model.

2. The computer-implemented method of claim 1, wherein the two or more structured scans comprise spherical laser scans.

3. The computer-implemented method of claim 1, wherein the segmenting comprises:
   determining a normal for each point of multiple points in the scan data;
   converting the two or more structured scans into a hierarchical data structure, wherein the hierarchical data structure organizes the multiple points in the two or more structured scans into the multiple segments based on the normal and spatial distance between the multiple points.

4. The computer-implemented method of claim 1, further comprising filtering the scan data by:
   filtering the scan data for each of the multiple segments based on a target model to be extracted; and
   further filtering the scan data for each of the multiple segments to remove scan data likely to decrease accuracy of the model to be extracted.

5. The computer-implemented method of claim 1, wherein the clustering comprises:
   generating a graph in which nodes of the graph comprise the model candidates fitted from a single segment, and edges of the graph are defined using a weight function; and
   determining which model candidates are in the same group based on the graph.

6. The computer-implemented method of claim 5, wherein the determining which model candidates are in the same group comprises:
   splitting the graph based on a variance between the model candidates, wherein the variance comprises a variance threshold.

7. The computer-implemented method of claim 1, wherein the labeling each cell located within the refined model as occupied comprises:
   determining a contour of the multiple segments that contribute to the refined model; and
   labeling each cell located within the contour as occupied using a flood filling technique.

8. The computer-implemented method of claim 1, wherein the back projection comprises:
   back tracing a ray from a scanner origin to a center of the cell being labeled;
   searching for neighbors, for the cell being labeled, in the structured scan being processed;
   if the neighbors are behind the cell being labeled, labeling the cell as empty; and
   if the neighbors are in front of the cell being labeled, then labeling the cell as occluded.

9. The computer-implemented method of claim 1, wherein the combining comprises:
   labeling the cell as occluded only when the cell is labeled as occluded from all of the two or more structured scans; and
   labeling the cell as empty if the cell is labeled as empty by any of the two or more structured scans.

10. The computer-implemented method of claim 1, wherein the further defining comprises:
    extracting model details by introducing occluded regions to the refined model by interpolating the model details.

11. A computer-implemented system for creating a three-dimensional computer-aided design (CAD) model, comprising:
    (a) a computer having a memory;
    (b) a processor executing on the computer;
    (c) the memory storing an application, wherein the application, when executed by the processor cause the processor to perform operations comprising:

(1) acquiring scan data from two or more structured scans of a real-world scene with a known scan position, wherein the scan data comprises three-dimensional (3D) image data;

(2) processing the scan data from each of the two or more structured scans by:
  (A) segmenting the scan data into multiple segments, wherein each of the multiple segments comprises a portion of the scan data with one or more similar surface properties;
  (B) fitting an initial model to the scan data, wherein the initial model comprises a model candidate;

(3) clustering the model candidates from the two or more structured scans into groups, wherein the model candidates in a same group are likely to be part of a same model;

(4) refining the clustered model candidates based on the model candidates in the same group resulting in a refined model;

(5) mapping a geometric space, comprising cells, over the refined model;

(6) labeling each of the cells in the geometric space by:
  (A) labeling each cell located within the refined model as occupied;
  (B) utilizing back projection to label each non-occupied cell;
  (C) subsequent to the back projection, combining the labels from the two or more structured scans; and (7) based on the labeling, further defining the refined model.

12. The computer-implemented system of claim 11, wherein the two or more structured scans comprise spherical laser scans.

13. The computer-implemented system of claim 11, wherein the segmenting comprises:
determining a normal for each point of multiple points of the scan data; and
converting the two or more structured scans into a hierarchical data structure, wherein the hierarchical data structure organizes the multiple points in the two or more structured scans into the multiple segments based on the normal and spatial distance between the multiple points.

14. The computer-implemented system of claim 11, further comprising filtering the scan data by:
filtering the scan data for each of the multiple segments based on a target model to be extracted; and
further filtering the scan data for each of the multiple segments to remove scan data likely to decrease accuracy of the model to be extracted.

15. The computer-implemented system of claim 11, wherein the clustering comprises:
generating a graph in which nodes of the graph comprise the model candidates fitted from a single segment, and edges of the graph are defined using a weight function; and
determining which model candidates are in the same group based on the graph.

16. The computer-implemented system of claim 15, wherein the determining which model candidates are in the same group comprises:
splitting the graph based on a variance between the model candidates, wherein the variance comprises a variance threshold.

17. The computer-implemented system of claim 11, wherein the labeling each cell located within the refined model as occupied comprises:
determining a contour of the multiple segments that contribute to the refined model; and
labeling each cell located within the contour as occupied using a flood filling technique.

18. The computer-implemented system of claim 11, wherein the back projection comprises:
back tracing a ray from a scanner origin to a center of the cell being labeled;
searching for neighbors, for the cell being labeled, in the structured scan being processed;
if the neighbors are behind the cell being labeled, labeling the cell as empty; and
if the neighbors are in front of the cell being labeled, then labeling the cell as occluded.

19. The computer-implemented system of claim 11, wherein the combining comprises:
labeling the cell as occluded only when the cell is labeled as occluded from all of the two or more structured scans; and
labeling the cell as empty if the cell is labeled as empty by any of the two or more structured scans.

20. The computer-implemented system of claim 11, wherein the further defining comprises extracting model details by introducing occluded regions to the refined model by interpolating the model details.

* * * * *